United States Patent
D'Souza et al.

(10) Patent No.: US 9,801,100 B2
(45) Date of Patent: Oct. 24, 2017

(54) ENABLING ECSFB IN HETNETS

(71) Applicant: Intel Corporation, Santa Clara, CA (US)

(72) Inventors: Maurice Gerard D'Souza, Los Angeles, CA (US); Rajeev Vokkarne, Los Angeles, CA (US); Shankarakrishnan Venkatraman, Santa Ana, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/773,866

(22) PCT Filed: Jun. 5, 2014

(86) PCT No.: PCT/IB2014/001989
§ 371 (c)(1),
(2) Date: Sep. 9, 2015

(87) PCT Pub. No.: WO2015/008151
PCT Pub. Date: Jan. 22, 2015

(65) Prior Publication Data
US 2016/0029254 A1    Jan. 28, 2016

Related U.S. Application Data

(60) Provisional application No. 61/831,533, filed on Jun. 5, 2013.

(51) Int. Cl.
*H04W 36/00* (2009.01)
*H04W 36/14* (2009.01)
(Continued)

(52) U.S. Cl.
CPC ....... *H04W 36/0022* (2013.01); *H04M 7/127* (2013.01); *H04W 36/0016* (2013.01);
(Continued)

(58) Field of Classification Search
CPC ............. H04W 36/00; H04W 36/0005; H04W 36/0016; H04W 36/0027; H04W 36/0083;
(Continued)

(56) References Cited

U.S. PATENT DOCUMENTS

| 2010/0215018 A1 | 8/2010 | Ejzak |
| 2011/0092211 A1 | 4/2011 | Osborn |

(Continued)

FOREIGN PATENT DOCUMENTS

| WO | WO-2015008151 A2 | 1/2015 |
| WO | WO-2015008151 A3 | 1/2015 |

OTHER PUBLICATIONS

"3rd Generation Partnership Project; Technical Specification Group Services and System Aspects; Circuit Switched (CS) fallback in Evolved Packet System (EPS); Stage 2 (Release 11)", 3GPP Standard; 3GPP TS 23.272, 3rd Generation Partnership Project (3GPP), Mobile Competence Centre vol. SA WG2, No. V11.4.0, (Mar. 5, 2013), 1-91.

(Continued)

*Primary Examiner* — Temica M Beamer
(74) *Attorney, Agent, or Firm* — Schwegman Lundberg & Woessner, P.A.

(57) ABSTRACT

An enhanced Circuit Switch Fallback enabled Heterogeneous Network (HETNET) is provided by the present invention in which the 1xIWS functionality is co-located with LTB eNB. It also tunnels 1xRTT over LTE messages directly to the Convergence Server over SIP, Further, it enables distributed PN-FAP identification determination. A mobile management, entity is configured to maintain multiple 1xCS IWS tunnels. Multiple 1xCS IWS tunnels are established, by using the same S1 tunnel end point used in establishing a Borne evolved Node B Gateway of the HETNET. The HETNET is configured to provide a correct FAP identifica-
(Continued)

tion to the convergence server so that handover preparation can be done.

19 Claims, 4 Drawing Sheets

(51) Int. Cl.
*H04M 7/12* (2006.01)
*H04W 48/16* (2009.01)
*H04W 84/04* (2009.01)
*H04W 88/06* (2009.01)

(52) U.S. Cl.
CPC ........... *H04W 36/14* (2013.01); *H04W 48/16* (2013.01); *H04W 84/045* (2013.01); *H04W 88/06* (2013.01)

(58) Field of Classification Search
CPC ..... H04W 16/14; H04W 16/04; H04W 16/24; H04W 88/06; H04W 88/12
USPC .............. 455/436–444, 448, 552.1, 560, 561
See application file for complete search history.

(56) References Cited

U.S. PATENT DOCUMENTS

| 2012/0120789 A1 | 5/2012 | Ramachandran et al. |
| 2012/0182912 A1 | 7/2012 | Watfa et al. |
| 2014/0287760 A1* | 9/2014 | Spinelli ................ H04W 92/02 455/437 |

OTHER PUBLICATIONS

"International Application Serial No. PCT/IB2014/001989, International Search Report mailed Mar. 17, 2015", 4 pgs.
"International Application Serial No. PCT/IB2014/001989, Written Opinion mailed Mar. 17, 2015", 8 pgs.

* cited by examiner

PN x REPORTED BY UE ON eNB 1
CORRESPONDS TO BS 1 AND BS 4

ENABLING ECSFB IN HETNETS

This application is a U.S. National Stage Filing under 35 U.S.C. 371 from International Application No. PCT/IB2014/001989, filed Jun. 5, 2014 and published in English as WO 2015/008151 on Jan. 22, 2015, which claims the benefit of priority to U.S. Provisional Patent Application Ser. No. 61/831,533, filed Jun. 5, 2013, each of which is incorporated herein by reference in its entirety.

BACKGROUND OF TITLE INVENTION

1. Field of the Invention

The present invention relates to communication networks including as plurality of small cells. More particularly, the invention relates to the management of small cell communication and call control in a Heterogeneous Network (HETNET).

2. Description of the Prior Art

Long-Term Evolution (LTE) is a standard for wireless communications. The standard was developed by the 3rd Generation Partnership Project (3GPP). The original standard is referred to as Release 8 and a follow-on with minor enhancements is referred to as Release 9. An aspect of Release 8 was the introduction of Circuit Switch Fallback (CSFB). CSFB provides the voice and messaging delivery to LTE devices, such as mobile phones, for example, through a circuit-switched network, such as global system for mobile communications (GSM), for example. CSFB is used in circuit-switched operations that arrive over LTE networks, which are packet-based. That is, CSFB is useful in HETNETs. The fallback is to enable signal exchange where older 2G or 3G functionality exist for a mobile device. The enhanced version of CSFB (eCSFB) established in Release 9 resolved some undesirable aspects of Release 8 CSFB including, for example, latency problems.

An example existing HETNET with eCSFB is shown in FIG. 1. Characteristics of CSFB and eCSFB are as follows.

3GPP Release 8 CSFB
  Request for Circuit Switched (CS) services (Mobile Originated (MO) and Mobile Terminated (MT)) are handled via Internetworking Function (IWF)
  LTE Evolved Packet System (EPS) supports CSFB by releasing Radio Resource Control (RRC) Connection and redirection to 1× Radio Transmission Technology or CDMA2000 1× (IS-2000) (1×RTT, which is a data transmission system used on Code Division Multiple Access (CDMA) networks that allows for connection speeds up to 144 kbps
  Pre-registration support for 1×RTT necessary; enabled via System Information Broadcast (SIB) 8 and tunneling of 1×RTT messages
3GPP Release 9 eCSFB
  Requires R9 User Equipment (UE), Mobile Management Entity (MME), Mobile Switching Center (MSC) and evolved Node B (eNB) support.
  Reduce Latency in 1×CSFB
    Enables tunneled messages between 3GPP's LTE air interface Evolved Universal Terrestrial Radio Access Network (EUTRAN) and 1×RTT
    Reduces CS voice call set up time by handover preparation and pre-assigning CDMA Channel
  Enables concurrent High Rate Packet Data (HRPD) Public Safety (PS) Handover
  Supports Dual Rx 1×CSFB
    Pre-registration not required. UE maintains 1×RTT context and re-registrations There may be some challenges associated with facilitating eCSFB in LTE HETNETs incorporating small cells, often referred to as femto cells, as follows.
  Current Session Initiation Protocol (SIP) based Convergence Server (CS) needs to be upgraded to interface with 1×CS IWS A interface Destination 1×FAP Identification Issue
  1×CS Internetworking Server (IWS) needs to obtain Pseudo Noise (PN)-1×Base Station (BS) Femtocell Access Point (FAP) Identification Mapping ("Inter-Radio Access Technologies (RAT) Neighbor Relation Table (NRT)"
  Multiple 1×RTT FAPs may share common PN
  Pilot Measurement with PN information/identification is not sufficient to identify 1×RTT BS/FAP
3GPP Release 8 CSFB
  Request for Circuit Switched (CS) services (Mobile Originated (MO) and Mobile Terminated (MT)) are handled via Internetworking Function (IWF)
  LTE Evolved Packet System (EPS) supports CSFB by releasing Radio Resource Control (RRC) Connection and redirection to 1×RTT, which is a data transmission system used on Code Division Multiple Access (CDMA) networks that allows for connection speeds up to 144 kbps
  Pre-registration support for 1×RTT necessary; enabled via SIB 8 and tunneling of 1×RTT messages
3GPP Release 9 eCSFB
  Requires R9 User Equipment (UE), Mobile Management Entity (MME), Mobile Switching Center (MSC) and evolved Node B (eNB) support.

What is needed is an Improved way to enable eCSFB in HETNETs.

SUMMARY OF THE INVENTION

The present invention provides an improved way to enable eCSFB in HETNETs by, among other things, co-locating the 1×IWS functionality with LTE eNB. It also tunnels 1×RTT over LTE messages directly to the Convergence Server over SIP. Further, it enables distributed PN-FAP identification determination. These and other advantages of the present invention will become more apparent upon review of the following detailed description, accompanying drawings and the appended claims.

DETAILED DESCRIPTION OF THE INVENTION

Generally described, the present disclosure relates to communication networks including a plurality of small cells.

Specifically, aspects of the present disclosure relate to the management of small cell communication and call control.

Figure 1:
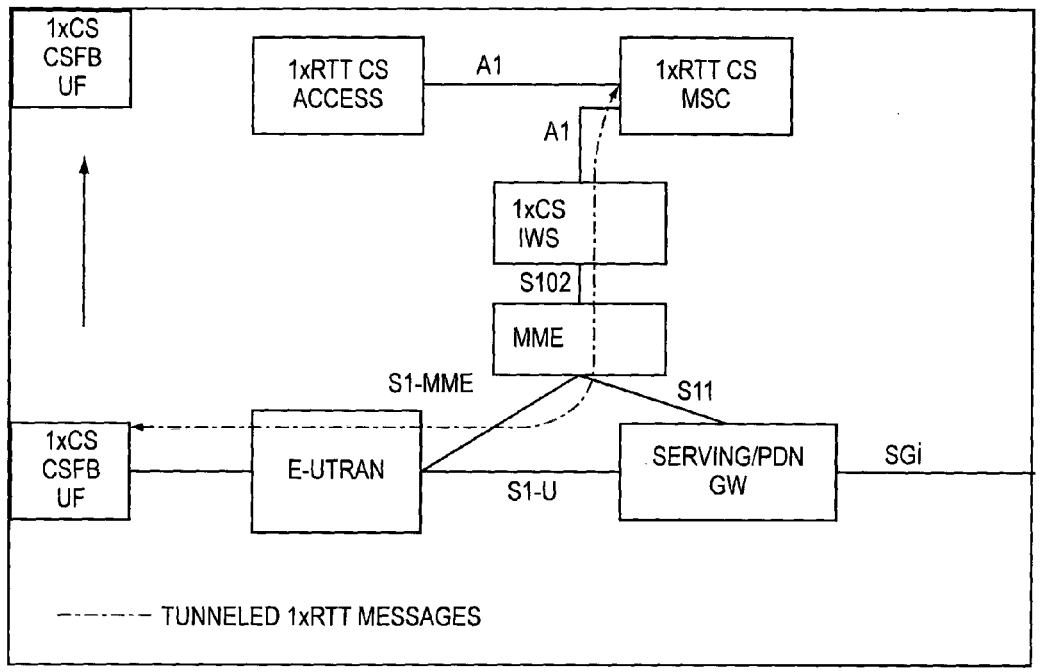
FIG. 1 is a block representation of an existing eCSFB in a HETNET.
Figure 2:
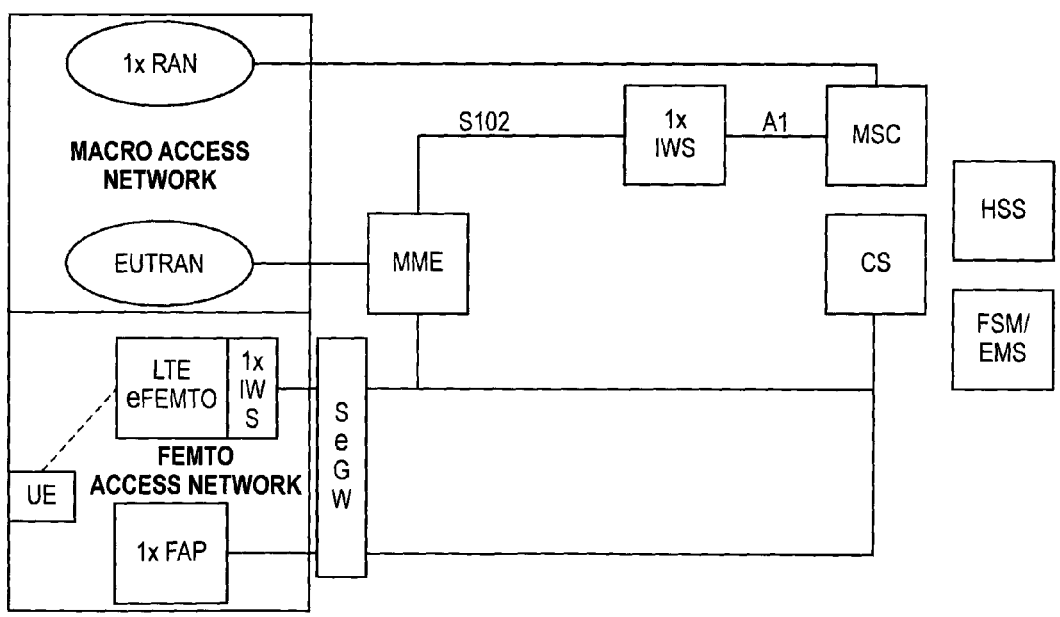
FIG. 2 is a block representation of the enabled eCSFB of the present invention.
Figure 3:
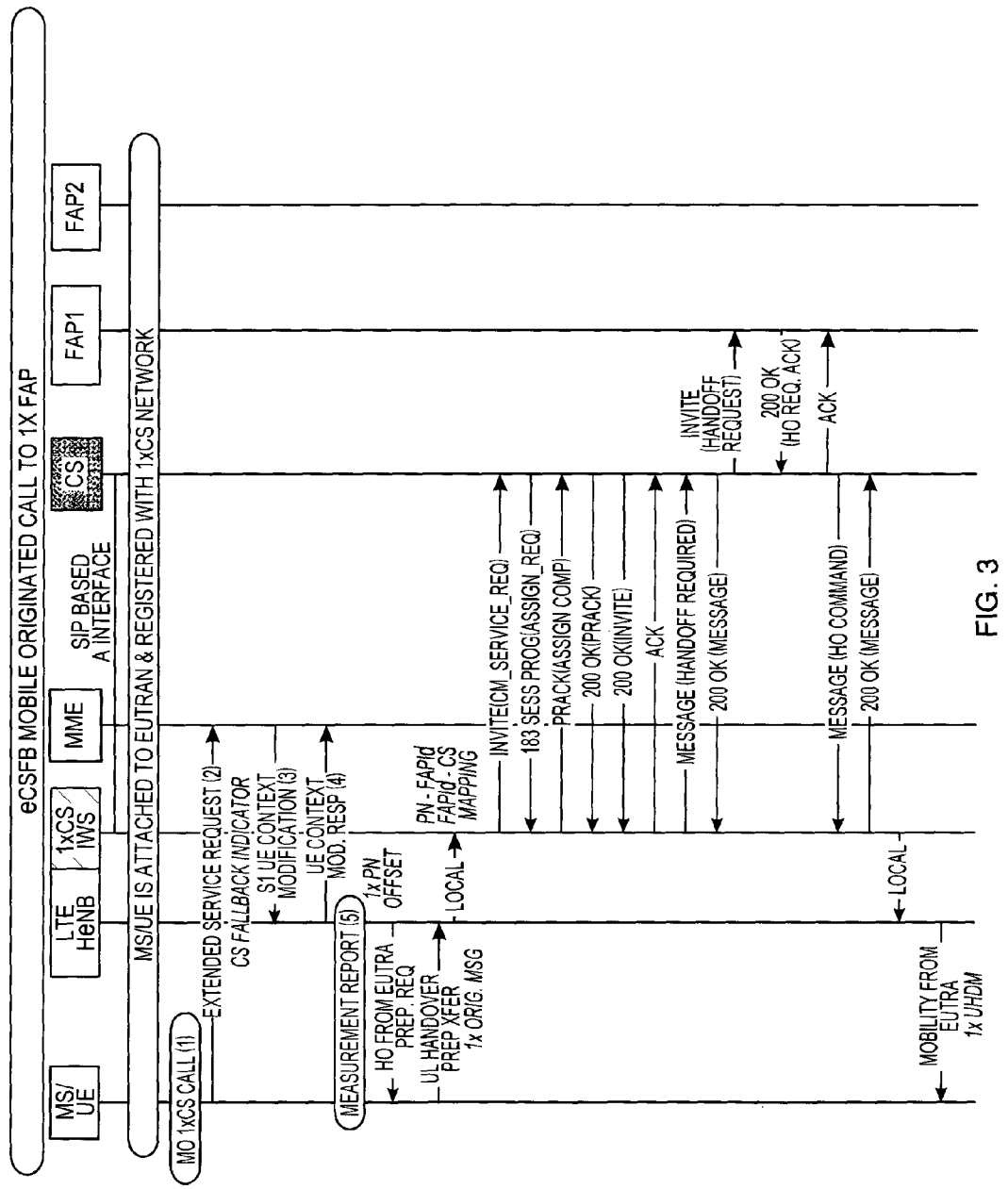
FIG. 3 is a flow representation of an embodiment for processing an eCSFB mobile originated call with the present invention.

With reference to FIG. 2, an eCSFB enabled HETNET of the present invention includes the follow:
- 1×IWS functionality is co-located with LTE eNB.
- LTE Femto with Collapsed IWS
- Incorporates IWS function (S102)
    - Tunnels 1×RTT over LTE messages directly to the convergence server over SIP
    - Reduces signaling loud on MME from multiple LTE femtos
    - Mitigates changes associated with CSFB on existing CS
- Enables distributed PN-FAP Identification determination
- The MME maintains multiple 1×CS IWS tunnels, which:
- Can be solved by using same S1 tunnel end point previously established to HeNB
- Can be mitigated by using Home evolved Node B Gateway (GW) act as 1×IWS towards MME FIG. 3 provides detail and illustration processing of eCSFB mobile originated calls as part of the present invention.

Figure 4:
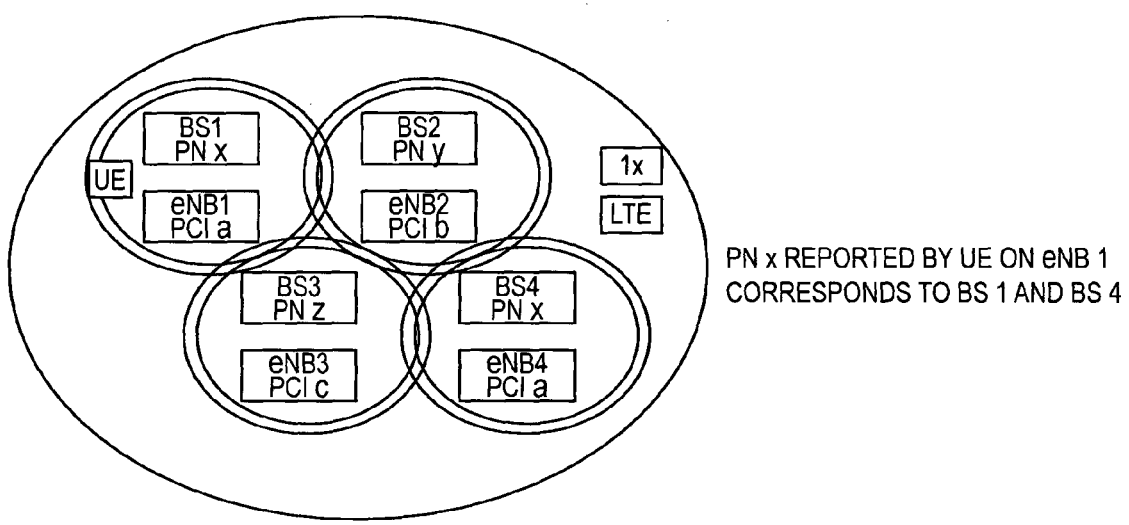
FIG. 4 is a representation of destination 1×FAP identification resolution established with the present invention.
Figure 5:
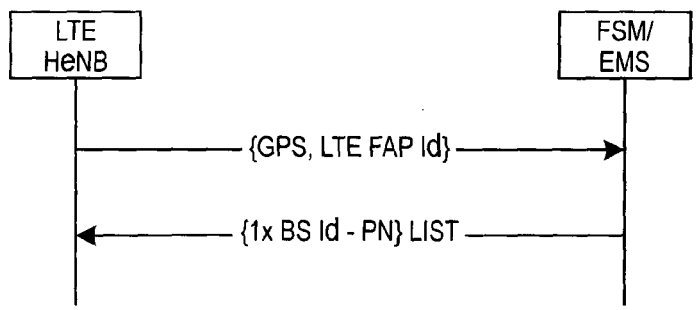
FIG. 5 is an illustration of an example FSM/EMS assisted inter-RAT NRT associated with the present invention.

FIG. 4 provides for Destination 1×FAP identification resolution as an aspect of the present invention in which
- Unique mapping between FAP Id and PN may not exist in femto/HETNET deployments
- 1×PN reported in UE measurement report needs to be related to 1×BS identification
- The correct FAP identification must be indicated to the CS so that handover preparation can be done.
- This can be resolved using any of the following methods:
    - Femtocell Station Modem (FSM)/Element Management System (EMS) assisted inter-RAT NRT
    - Automated NRT discovery based on UE tracking
    - Using 1×RTT FAP based measurements
    - Using UE identification
    - Multiple Target Preparation and NRT Optimization For the FSM/EMS assisted inter-RAT NRT option, with respect to FIG. 5, the LTE HeNB reports GPS location and LTE FAP identification to the FSM. The FSM provides a list of neighboring 1×RTT PN and BS identifications. Based on matching GPS location between 1× and LTE FAP all 1×RTT FAPs within a specified area are reported. Optionally, 1×RTT FAPs are determined by pre-configured Inter-RAT Neighbor Relation Table (NRT).

Automated NRT discovery based on UE tracking can be described as:
1. LTE eNB initialized in "inter-RAT NRT Discovery Mode" (at startup or periodically)
2. UE is connected to EUTRAN, 1×RTT MO call is initiated.
3. 1×RTT Inter RAT measurements requested from UE
4. UE reports PN "x"

Using 1×FAP based measurements can be described as:
a) Call re-directed to 1×RTT
b) IWS sends UL RSSI measurement request to CS after re-direction
c) Measurement request list comprises of 1×RTT FAPs in existing NRT with PN "x"
d) Alternatively, CS may determine list of 1×RTT FAPs based on PN
e) CS determines candidate 1×RTT FAP based on RSSI measurement
f) CS notifies LTE eNB-1×IWS of candidate 1×RTT FAP
g) LTE eNB-1×IWS NRT is updated to map PN "x" to FAP Id. "$BS_i$"

Using UE Identification can be described as follows:
a) LTE eNB sends handoff (HO) from EUTRA Prepared Request
b) UE responds with UL HO Prepared Transfer containing 1×RTT Origination Message
c) IWS records UE Unique Identity "i"
d) Call is re-directed to 1×RTT
e) IWS sends UE Identification Request to CS for UE Unique Identity "i"
f) CS enables timer associated with UE Identity "i"
g) Upon 1×RTT Origination from UE "i" via FAP Id "$BS_i$" prior to timer expiry
    i) CS sends Message back to LTE FAP (or 1×CS IWS) with FAP Id
    ii) Reset Timer
h) LTE eNB-1×IWS NRT is updated to map PN "x" to FAP Id "$BS_i$"

Figure 6:
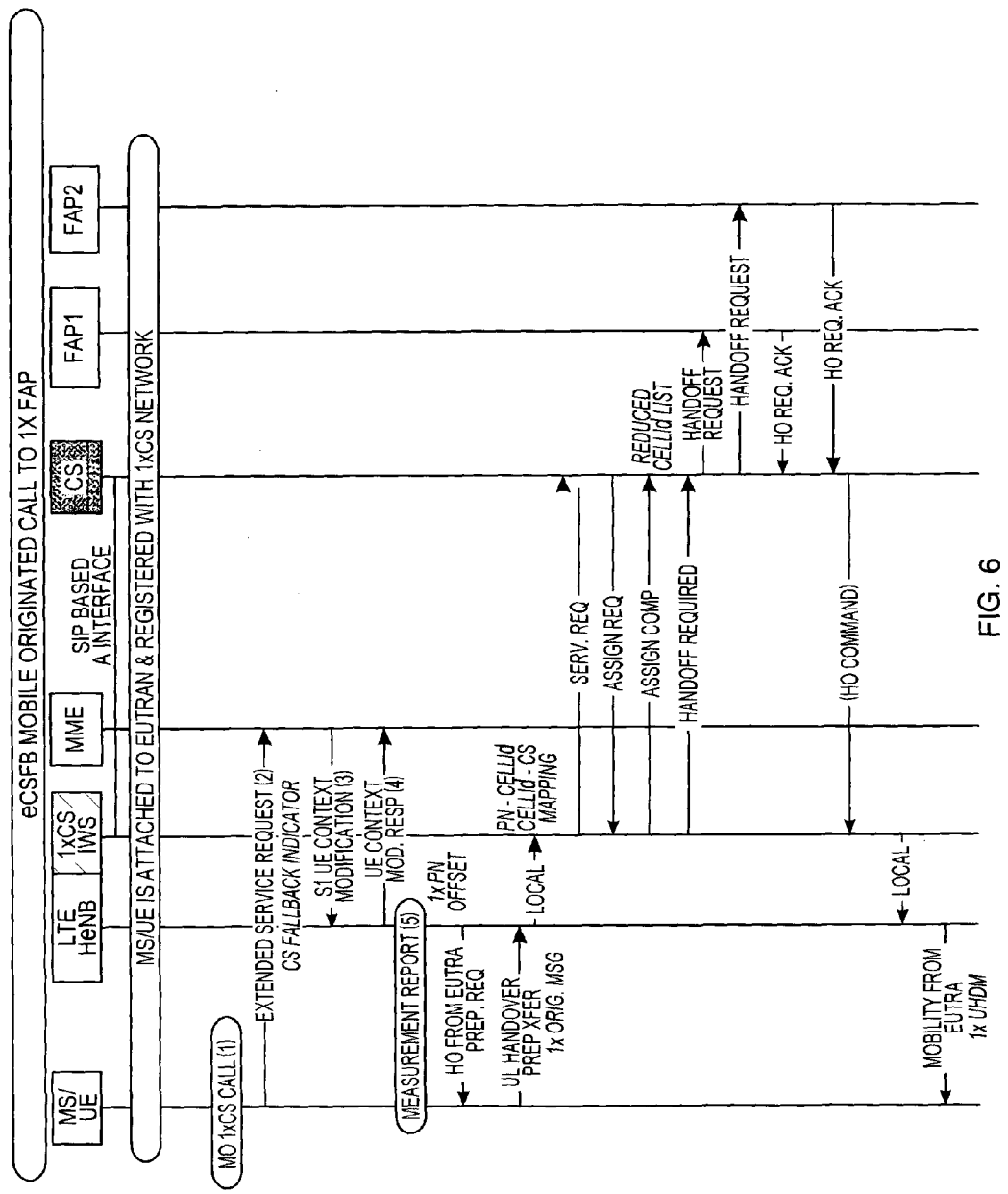
FIG. 6 is a now representation of an embodiment of multiple target preparation associated with the present invention.

Using Multiple Target Preparation and NRT Optimization can be described as follows in view of FIG. 6:
- Mitigation of 1×FAP Confusion based on Multiple Target Preparation
    - Inter-RAT NRT initialized based on FSM/EMS message exchange
    - HO Request sent to all 1×FAPs using PN "x" as listed in Inter-RAT NRT
- Inter RAT NRT Optimization based on HO Success
    - Initial Optimization may fail to isolate cells sharing similar co-ordinates.
    - CS records 1×RTT FAP which reports successful HO after 1×RTT universal handoff direction message (UHDM) is issued
    - CS reports FAP Id to LTE eNB or IWS
    - LTE eNB or IWS updates PN "x" to be only associated with reported FAP Id
    - Neighbors of existing entries in NRT can also be considered as potential neighbors While illustrative embodiments have been disclosed and discussed, one skilled in the relevant art will appreciate that additional or alternative embodiments may be implemented within the spirit and scope of the present disclosure. Additionally, although many embodiments have been indicated as illustrative. One skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the coo as used, is generally intended to convey that certain embodiments include, while other embodiments do not include, certain features, elements, or steps. Thus, such conditional language is not generally intended to imply that features, elements or steps are in raw way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally in to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process, Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An enhanced Circuit Switch Fallback (eCSFB) enabled Heterogeneous Network (HETNET) comprising:
   a. a macro access network;
   b. a femtocell access network including a single-carrier femtocell access point (1×FAP) and a co-located single-carrier interworking server (1×IWS) arranged in an enabled Node B, and
   c. a mobile management entity coupled to the macro access network and the femtocell access network,
   wherein the mobile management entity is configured to tunnel single-carrier Radio Transmission Technology (1×RTT) directly from the 1×IWS to a convergence server over session initiation protocol (SIP), the convergence server serving the macro access network and the femto access network, and
   wherein the HETNET is configured to provide a correct FAP identification to the convergence server for handover preparation using at least one of a Forward Short Message/Enhanced Messaging Service Message (FSM/EMS) assisted inter-radio access technology (RAT) Neighbor Relation Table (NRT), automated NRT discovery based on user equipment tracking or multiple target preparation and NRT optimization.

2. The HETNET of claim 1 wherein the mobile management entity is configured to maintain multiple single-carrier circuit switched interworking server (1×CS IWS) tunnels.

3. The HETNET of claim 2 wherein the multiple 1×CS IWS tunnels are established by using the same S1 tunnel end point used in establishing a Home evolved Node B Gateway of the HETNET.

4. The HETNET of claim 1 wherein the correct FAP identification is provided using a Forward Short Message/Enhanced Messaging Service Message (FSM/EMS) assisted inter-radio access technology (RAT) Neighbor Relation Table (NRT).

5. The HETNET of claim 1 wherein the correct FAP identification is provided using automated NRT discovery based on user equipment tracking.

6. The HETNET of claim 1 wherein the correct FAP identification is provided using 1×RTT FAP based measurements.

7. The HETNET of claim 1 wherein the correct FAP identification is provided using multiple target preparation and NRT optimization.

8. The HETNET of claim 7 wherein multiple target preparation and NRT optimization is accomplished by mitigation of 1×FAP confusion by:
   Inter-RAT NRT initialized based on FSM/EMS message exchange;
   HO Request sent to all 1×FAPs using PN "x" as listed in Inter-RAT NRT;
   Inter RAT NRT Optimization based on handoff (HO) Success;
   Initial Optimization may fail to isolate cells sharing similar co-ordinates;
   CS records 1×RTT FAP which reports successful HO after 1×RTT Universal Handoff Direction Message (UHDM) is issued;
   CS reports FAP Id to LTE eNB or IWS;
   LTE eNB or IWS updates PN "x" to be only associated with reported FAP Id; and
   Neighbors of existing entries in NRT can also be considered as potential neighbors.

9. A mobile management entity (MME) comprising:
   interface circuitry to communicate with a macro access network and a femtocell access network of a heterogeneous network (HetNet);
   processing circuitry to establish multiple single-carrier circuit switched (1×CS) interworking server (IWS) tunnels using a same S1 interface tunnel end point for enhanced circuit switch feedback (eCSFB) operation,
   wherein the IWS tunnels provide Single-Carrier Radio Transmission Technology (1×RTT) tunneled messages directly to a convergence server (CS) in accordance with a session initiation protocol (SIP), and
   wherein the HetNet is configured to provide a correct FAP identification to the convergence server for handover preparation using at least one of a Forward Short Message/Enhanced Messaging Service Message (FSM/EMS) assisted inter-radio access technology (RAT) Neighbor Relation Table (NRT), automated NRT discovery based on user equipment tracking or multiple target preparation and NRT optimization.

10. The MME of claim 9, wherein the processing circuitry is configured to enable eCSFB operation on the HetNet by colocation of 1×IWS functionality with a Long-Term Evolution (LTE) eNB.

11. The MME of claim 10 wherein the IWS tunnels interface between a Single-Carrier Radio Transmission Technology (1×RTT) air interface and a LTE air interface.

12. The MME of claim 11 wherein the Single-Carrier Radio Transmission Technology (1×RTT) air interface comprises a CDMA air interface and the LTE air interface comprises an OFDMA air interface.

13. The MME of claim 12 wherein the same S1 interface tunnel end point is an endpoint of an S1 interface between an enhanced Node B (eNB) and the MME.

14. The MME of claim 13 wherein the processing circuitry is configured to:
   maintain the multiple 1×CS IWS tunnels using the same S1 interface tunnel end point; and migrate 1×CS IWS tunnels using a home eNB gateway configured to operate as a 1×CS IWS toward the MME.

15. The MME of claim 9 wherein the processing circuitry is configured to provide a femto-access point (FAP) identification to the convergence server for handover preparation, the FAP identification based on 1×RTT FAP based measurements.

16. A non-transitory computer-readable storage medium that stores instructions for execution by one or more processors of a mobile management entity (MME) to configure the MME to perform operations to:
communicate with a macro access network and a femtocell access network of a heterogeneous network (HetNet); and
establish multiple single-carrier circuit switched (1×CS) inter-working server (IWS) tunnels using a same S1 interface tunnel end point for enhanced circuit-switch feedback (eCSFB) operation, wherein the IWS tunnels provide Single-Carrier Radio Transmission Technology (1×RTT) tunneled messages directly to a convergence server (CS) in accordance with a session initiation protocol (SIP),
wherein the HetNet is configured to provide a correct FAP identification to the convergence server for handover preparation using at least one of a Forward Short Message/Enhanced Messaging Service Message (FSM/EMS) assisted inter-radio access technology (RAT) Neighbor Relation Table (NRT), automated NRT discovery based on user equipment tracking or multiple target preparation and NRT optimization.

17. The non-transitory computer-readable storage medium of claim 16 wherein the instructions enable the one or more processors to enable eCSFB operation on the HetNet by colocation of 1×IWS functionality with a Long-Term Evolution (LTE) eNB.

18. A method for operating a mobile management entity (MME), the method comprising:
communicating with a macro access network and a femtocell access network of a heterogeneous network (HetNet); and
establishing multiple single-carrier circuit switched (1×CS) inter-working server (IWS) tunnels using a same S1 interface tunnel end point for enhanced circuit-switch feedback (eCSFB) operation, wherein the IWS tunnels provide Single-Carrier Radio Transmission Technology (1×RTT) tunneled messages directly to a convergence server (CS) in accordance with a session initiation protocol (SIP),
wherein the HetNet is configured to provide a correct FAP identification to the convergence server for handover preparation using at least one of a Forward Short Message/Enhanced Messaging Service Message (FSM/EMS) assisted inter-radio access technology (RAT) Neighbor Relation Table (NRT), automated NRT discovery based on user equipment tracking or multiple target preparation and NRT optimization.

19. The method of claim 18 further comprising enabling eCSFB operation on the HetNet by colocation of 1×IWS functionality with a Long-Term Evolution (LTE) eNB.

\* \* \* \* \*